(12) United States Patent
Dou et al.

(10) Patent No.: US 11,334,668 B2
(45) Date of Patent: May 17, 2022

(54) CACHE SECURING METHOD AND DEVICE CAPABLE OF RESISTING SIDE CHANNEL ATTACK

(71) Applicant: PHYTIUM TECHNOLOGY CO.,LTD., Tianjin (CN)

(72) Inventors: Qiang Dou, Tianjin (CN); Tianlei Zhao, Tianjin (CN); Chengyi Zhang, Tianjin (CN); Jun Gao, Tianjin (CN); Hongbo Xue, Tianjin (CN); Xiaoyan Liu, Tianjin (CN); Wenzhe Li, Tianjin (CN); Yujiao Wang, Tianjin (CN); Jiahong Yuan, Tianjin (CN); Longpeng Sun, Tianjin (CN); Shuijingtao Li, Tianjin (CN); Zhe Ding, Tianjin (CN); Xiaofeng Wang, Tianjin (CN); Xiaodao Wang, Tianjin (CN); Wenhui Cao, Tianjin (CN); Shuaike Zheng, Tianjin (CN); Boqing You, Tianjin (CN); Yuan Yuan, Tianjin (CN); Xiaoli Zou, Tianjin (CN)

(73) Assignee: PHYTIUM TECHNOLOGY CO., LTD., Tianjin (CN)

( * ) Notice: Subject to any disclaimer, the term of this patent is extended or adjusted under 35 U.S.C. 154(b) by 180 days.

(21) Appl. No.: 16/627,369

(22) PCT Filed: Dec. 30, 2018

(86) PCT No.: PCT/CN2018/125953
§ 371 (c)(1),
(2) Date: Feb. 25, 2020

(87) PCT Pub. No.: WO2020/000989
PCT Pub. Date: Jan. 2, 2020

(65) Prior Publication Data
US 2020/0242243 A1    Jul. 30, 2020

(30) Foreign Application Priority Data

Jun. 26, 2018 (CN) .......................... 201810667796.4

(51) Int. Cl.
*G06F 21/55* (2013.01)
(52) U.S. Cl.
CPC ...... *G06F 21/556* (2013.01); *G06F 2221/034* (2013.01)
(58) Field of Classification Search
CPC .................................................... G06F 21/556
See application file for complete search history.

(56) References Cited

U.S. PATENT DOCUMENTS 6,715,036 B1 * 3/2004 Burton ................ G06F 11/1008
711/112
9,311,251 B2 * 4/2016 Biswas ................ G06F 12/126
(Continued)

FOREIGN PATENT DOCUMENTS

CN          1870627 A    11/2006
CN        105550574 A     5/2016
(Continued)

*Primary Examiner* — Dao Q Ho
(74) *Attorney, Agent, or Firm* — Bayramoglu Law Office LLC

(57) ABSTRACT

A method and a device for securing a cache against side channel attacks are provided. An allocator identifier ALLOCATOR field is added to each cache entry in the present disclosure. Whenever an entry is allocated in the cache, the identifier of the software domain currently running on the processor is filled into the ALLOCATOR field of the allocation entry. When accessing the cache, the cache entry can be hit only if the identifier of the software domain currently running on the processor is identical to the ALLOCATOR field in the cache entry. If the cache entry to be replaced is invalid or its ALLOCATOR field is identical to the identifier of the software domain currently running on the processor, (Continued)

then the existing entry in the cache is replaced directly; otherwise, the entire cache is emptied.

6 Claims, 3 Drawing Sheets

(56) References Cited

U.S. PATENT DOCUMENTS

| | | | | |
|---|---|---|---|---|
| 2011/0208907 A1* | 8/2011 | Raikin | ............... | G06F 21/10 |
| | | | | 711/105 |
| 2015/0373036 A1* | 12/2015 | Patne | ............... | G06F 21/755 |
| | | | | 726/23 |
| 2016/0092677 A1* | 3/2016 | Patel | ............... | G06F 9/468 |
| | | | | 726/23 |
| 2018/0300182 A1* | 10/2018 | Hwang | ............... | G06F 9/505 |

FOREIGN PATENT DOCUMENTS

| | | |
|---|---|---|
| CN | 106878247 A | 6/2017 |
| CN | 109033826 A | 12/2018 |

* cited by examiner

CACHE SECURING METHOD AND DEVICE CAPABLE OF RESISTING SIDE CHANNEL ATTACK

CROSS REFERENCE TO THE RELATED APPLICATIONS

This application is the national phase entry of International Application No. PCT/CN2018/125953, filed on Dec. 30, 2018, which is based upon and claims priority to Chinese Patent Application No. 201810667796.4, filed on Jun. 26, 2018, the entire contents of which are incorporated herein by reference.

TECHNICAL FIELD

The present disclosure relates to a cache management technique in a microprocessor, and particularly relates to a method and device for securing caches against side channel attacks.

BACKGROUND

Caches are widely used in microprocessors. They generally store specific common information used during program execution, such as instruction codes, data, virtual physical address mapping, branch misprediction history, branch target address history, and so on. Such information is stored in a cache in a microprocessor chip to reduce the access time and/or avoid energy consumption caused by obtaining this information from a location outside the microprocessor. Accessing this information directly on the chip, decreases the pause time in the processor pipeline to achieve improved performance, and/or to reduce power consumption. FIG. 1 shows the general structure of caches in a processor, where each cache entry includes tags, attributes, and data.

The caches described in the present disclosure includes an instruction cache (ICache), a data cache (DCache), a unified cache, a translation look-aside Buffer (TLB), a branch history buffer (BHB), a branch-target buffer (BTB), an indirect branch target buffer (IBTB), a store buffer (SB), a line fill buffer (FB), a loop buffer (LB), and other various caches with similar functions.

Although various processor caches have the advantages of improving performance and reducing power consumption, they are vulnerable to side-channel attacks. The principle of side-channel attacks against caches is that when sensitive information is processed by privileged software, the state of the processor cache will be changed accordingly, and this change is usually strongly correlated with sensitive information. By detecting the change of the cache state, the sensitive information that an unauthorized attacker should not have access to is extracted. Details are provided below.

A hardware, such as a processor, usually sets several privilege levels for users. User programs usually run at the lowest privilege level, and operating system software, virtual machine manager software, and security manager software run at higher privilege levels, respectively. The processor provides hardware protection mechanisms for system registers and storage areas, so the lowest privileged level of software cannot access the protected system registers or storage areas. Among them, the access right of the system registers is generally fixed, and the access right of the storage areas is usually configurable.

Under these hardware privilege protection mechanisms, the lowest privileged software usually cannot access the system registers or memory of the higher privileged software. However, if the state of the processor cache is changed during the running of the higher privileged software, and the change of the cache state is correlated with the data accessed by the higher privileged software, then the lowest privileged software can obtain the data that the higher privileged software accessed by means of detecting the change in the cache state. Because the higher privileged software can access a lot of sensitive information, including data of all user programs, a malicious program can conduct a side-channel attack on the caches to steal the sensitive information that a malicious program could not normally access.

One form of side-channel attacks against caches is Flush+Reload. In this attack form, the attack software, running at a low-privileged level, first wipes all or part of the cache entries, and then calls certain services of the high-privileged software. The higher privileged software may come in contact with some sensitive data when running and allocates some other new data into the cache. There was a correlation between the data newly allocated into the cache and the sensitive data. The state of the cache will affect the instruction execution speed. For example, when there is cache hit, the program execution speed is usually increased. Therefore, the data that is allocated into the cache can be detected by measuring the instruction execution speed.

The value of the sensitive data can be extracted according to the correlation between the cache state and the sensitive data.

Another form of side-channel attacks against caches is Prime+Probe. In this attack form, an attack software runs at a low privilege level. The attack software first fills all or part of the cache entries with its own data, and then calls certain services of the higher privilege level software. The higher privileged software contacts some sensitive data when running and allocates some new data into the cache. During the allocation, the cache entries of the attack software are replaced, and there is a correlation between the replaced cache entries and the sensitive data. The state of the cache will affect the instruction execution speed. For example, when there is a cache hit, the program execution speed is usually increased. Therefore, which cache entries have been replaced can be detected by measuring the instruction execution speed, and the value of the sensitive data can be extracted according to the correlation between the cache state and the sensitive data.

Therefore, securing caches against side-channel attacks to effectively improve the security of the microprocessor and the entire information system has become a key technical problem to be solved.

SUMMARY

The technical problem in the prior art is described above. A method and device for securing a cache against side channel attacks is provided by the present disclosure. The present disclosure can secure the cache in the processor against side channel attacks through using less hardware that can improve the security of the processor, and has the advantages of easy to implement, wide application range, and relatively low performance penalty.

In order to solve the above technical problems, the present disclosure employs the following technical solution.

A method for securing a cache against side channel attacks includes the following steps:

1) obtaining an operation request for the cache, wherein each entry of the cache includes an allocator identifier ALLOCATOR field; when the operation request is to allocate an entry, skipping to perform step 2); when the operation request is to access an entry, skipping to perform step 3); and when the operation request is to replace an entry, skipping to perform step 4):

2) allocating an entry for the operation request, and executing an allocation of a cache securing strategy; filling the identifier of the software domain currently running on the processor into the ALLOCATOR field of the allocated entry; ending and exiting:

3) accessing the cache for the operation request, and executing an access of the cache securing strategy; hitting the cache entry only if the identifier of the software domain currently running on the processor is identical to the ALLOCATOR field of the hit cache entry; not hitting the cache entry if the identifier of the software domain currently running on the processor is different from the ALLOCATOR field of the cache entry; ending and exiting: and 4) replacing the cache for the operation request, and executing a replacement of the cache securing strategy: replacing directly if the cache entry to be replaced is in invalid state, or the ALLOCATOR field thereof is identical to the identifier of the software domain currently running on the processor; clearing the entire cache if the cache entry to be replaced is valid and the ALLOCATOR field thereof is different from the identifier of the software domain currently running on the processor; ending and exiting.

Preferably, the identifier of the software domain in step 2) specifically refers to one or a combination of a current privilege level, a virtual machine identifier (ID), a process ID, and an in-process software domain partition ID.

Preferably, the step of not hitting the cache entry in step 3) further includes waiting for a predefined number of T clock cycles, and then using the data stored in the cache entry and changing the ALLOCATOR field of the entry to the identifier of the software domain currently running on the processor.

Preferably, the detailed step of clearing the entire cache in step 4) includes: if the cache is a fully-associative cache, then directly replacing the selected cache entry to be replaced; and if the cache is a set-associative cache, then invalidating the entire cache. The present disclosure further provides a method for securing a cache against side channel attacks including the following steps:

1) reading a unified hardware control bit SC_HARDEN_EN_G, and obtaining an operation request for the cache, wherein an entry of the cache includes an allocator identifier ALLOCATOR field; when the operation request is the allocation entry, skipping to perform step 2); when the operation request is an access entry, skipping to perform step 3); and when the operation request is a replacement entry, skipping to perform step 4);

2) allocating an entry for the operation request, and executing an allocation of a cache securing strategy if the hardware control bit SC_HARDEN_EN_G is turned on: filling an identifier of a software domain currently running on the processor into the ALLOCATOR field of the allocation entry; ending and exiting;

3) accessing the cache for the operation request, and executing an access of the cache securing strategy if the hardware control bit SC_HARDEN_EN_G is turned on: hitting the cache entry only if the identifier of the software domain currently running on the processor is identical to the ALLOCATOR field in the cache entry; not hitting the cache entry if the identifier of the software domain currently running on the processor is different from the ALLOCATOR field in the cache entry; ending and exiting; and 4) replacing the cache for the operation request, and executing a replacement of the cache securing strategy if the hardware control bit SC_HARDEN_EN_G is turned on: replacing directly if the cache entry to be replaced is invalid, or the ALLOCATOR field thereof is identical to the identifier of the software domain currently running on the processor; clearing the entire cache if the cache to be replaced is valid and the ALLOCATOR field thereof is different from the identifier of the software domain currently running on the processor; ending and exiting.

The present disclosure further provides a method for securing a cache against side channel attacks including the following steps:

1) obtaining an operation request for the cache, and reading a hardware control bit SC_HARDEN_EN_TLB corresponding to the target cache of the current operation request; wherein an entry of the cache includes an allocator identifier ALLOCATOR field; when the operation request is the allocation entry, skipping to perform step 2); when the operation request is an access entry, skipping to perform step 3); and when the operation request is a replacement entry, skipping to perform step 4);

2) allocating an entry for the operation request, and executing an allocation of a cache securing strategy if the hardware control bit SC_HARDEN_EN_TLB is turned on: filling an identifier of a software domain currently running on the processor into the ALLOCATOR field of the allocation entry; ending and exiting;

3) accessing the cache for the operation request, and executing an access of the cache securing strategy if the hardware control bit SC_HARDEN_EN_TLB is turned on: hitting the cache entry only if the identifier of the software domain currently running on the processor is identical to the ALLOCATOR field in the cache entry; not hitting the cache entry if the identifier of the software domain currently running on the processor is different from the ALLOCATOR field in the cache entry; ending and exiting; and 4) replacing the cache for the operation request, and executing a replacement of the cache securing strategy if the hardware control bit SC_HARDEN_EN_TLB is turned on: replacing directly if the cache entry to be replaced is invalid, or the ALLOCATOR field thereof is identical to the identifier of the software domain currently running on the processor; clearing the entire cache if the cache to be replaced is valid and the ALLOCATOR field thereof is different from the identifier of the software domain currently running on the processor; ending and exiting.

The present disclosure further provides a method for securing a cache against side channel attacks including the following steps:

1) reading a unified hardware control bit SC_HARDEN_EN_G, obtaining an operation request for the cache, and reading a hardware control bit SC_HARDEN_EN_TLB corresponding to the target cache of the current operation request, wherein an entry of the cache includes an allocator identifier ALLOCATOR field; when the operation request is the allocation entry, skipping to perform step 2); when the operation request is an access entry, skipping to perform step 3); and when the operation request is a replacement entry, skipping to perform step 4);

2) allocating an entry for the operation request, and executing an allocation of a cache securing strategy if the hardware control bit SC_HARDEN_EN_G and the hardware control bit SC_HARDEN_EN_TLB are both turned on: filling an identifier of a software domain currently running on the processor into the ALLOCATOR field of the allocation entry; ending and exiting;

3) accessing the cache for the operation request, and executing an access of the cache securing strategy if the hardware control bit SC_HARDEN_EN_G and the hardware control bit SC_HARDEN_EN_TLB are both turned on: hitting the cache entry only if the identifier of the software domain currently running on the processor is identical to the ALLOCATOR field in the cache entry; not hitting the cache entry if the identifier of the software domain currently running on the processor is different from the ALLOCATOR field in the cache entry; ending and exiting; and 4) replacing the cache for the operation request, and executing a replacement of the cache securing strategy if the hardware control bit SC_HARDEN_EN_G and the hardware control bit SC_HARDEN_EN_TLB are both turned on: replacing directly if the cache entry to be replaced is invalid, or the ALLOCATOR field thereof is identical to the identifier of the software domain currently running on the processor; clearing the entire cache if the cache to be replaced is valid and the ALLOCATOR field thereof is different from the identifier of the software domain currently running on the processor; ending and exiting.

The present disclosure further provides a method for securing a cache against side channel attacks including the following steps:

1) reading a unified hardware control bit SC_HARDEN_EN_G, obtaining an operation request for the cache, and reading a hardware control bit SC_HARDEN_EN_TLB corresponding to the target cache of the current operation request, wherein an entry of the cache includes an allocator identifier ALLOCATOR field; when the operation request is the allocation entry, skipping to perform step 2); when the operation request is an access entry, skipping to perform step 3); and when the operation request is a replacement entry, skipping to perform step 4);

2) allocating an entry for the operation request, and executing an allocation of a cache securing strategy if the hardware control bit SC_HARDEN_EN_G is turned off and the hardware control bit SC_HARDEN_EN_TLB is turned on: filling an identifier of a software domain currently running on the processor into the ALLOCATOR field of the allocation entry; ending and exiting;

3) accessing the cache for the operation request, and executing an access of the cache securing strategy if the hardware control bit SC_HARDEN_EN_G is turned off and the hardware control bit SC_HARDEN_EN_TLB is turned on: hitting the cache entry only if the identifier of the software domain currently running on the processor is identical to the ALLOCATOR field in the cache entry; not hitting the cache entry if the identifier of the software domain currently running on the processor is different from the ALLOCATOR field in the cache entry; ending and exiting; and 4) replacing the cache for the operation request, and executing a replacement of the cache securing strategy if the hardware control bit SC_HARDEN_EN_G is turned off and the hardware control bit SC_HARDEN_EN_TLB is turned on: replacing directly if the cache entry to be replaced is invalid, or the ALLOCATOR field thereof is identical to the identifier of the software domain currently running on the processor; clearing the entire cache if the cache to be replaced is valid and the ALLOCATOR field thereof is different from the identifier of the software domain currently running on the processor; ending and exiting.

The present disclosure further provides a device for securing a cache against side channel attacks, which includes a microprocessor with a cache management module, and the cache management module is programmed to perform the steps of the method for securing the cache against the side channel attacks according to the present disclosure.

Compared with the prior art, the present disclosure has the following advantages.

1. By adding the ALLOCATOR field to the cache entry to identify the privilege level of the processor when the entry is allocated, the present disclosure can prevent the lower privileged software from detecting the cache state change introduced by the higher privileged software. It can also prevent the lower privileged software from affecting the operation of the higher privileged software through specific settings of cached content. This prevents the lower privileged software from stealing sensitive data associated with the high-privileged software through cache side-channel attack techniques.

2. The hardware cost is relatively low. The present disclosure only needs to add an ALLOCATOR field and a related hit check and replacement logic in each cache entry. The ALLOCATOR field usually only takes 2-3 bits of storage space (depending on the number of privilege levels of the instruction system). The ALLOCATOR check logic is only equality judgment circuit 2-3 bits. The replacement processing logic is not complicated, too. Therefore, the hardware cost is relatively low.

3. The performance penalty is relatively low. The method provided by the present disclosure only adds a 2-3 bits of comparison when searching the cache, and the replacement logic is not on the critical path, so the impact on timing is extremely minimized. In addition, since there is no need to clear the cache when switching privilege levels, and only avoiding sharing cache entries between different privilege levels, the performance penalty is lower compared to software methods.

4. The compatibility is good. The cache securing method provided by the present disclosure can be completely implemented in hardware, no software modifications are needed, and are completely compatible with existing softwares.

5. The cache securing method can be applied to many areas. The cache securing method provided by the present disclosure is applicable to various cache structures in a processor, including, but not limited to, the ICache, the DCache, the Unified Cache, the TLB, the BHB, the BTB, the IBTB, the SB, the FB, the LB, and others.

DETAILED DESCRIPTION OF THE EMBODIMENTS

Embodiment 1

Figure 1:
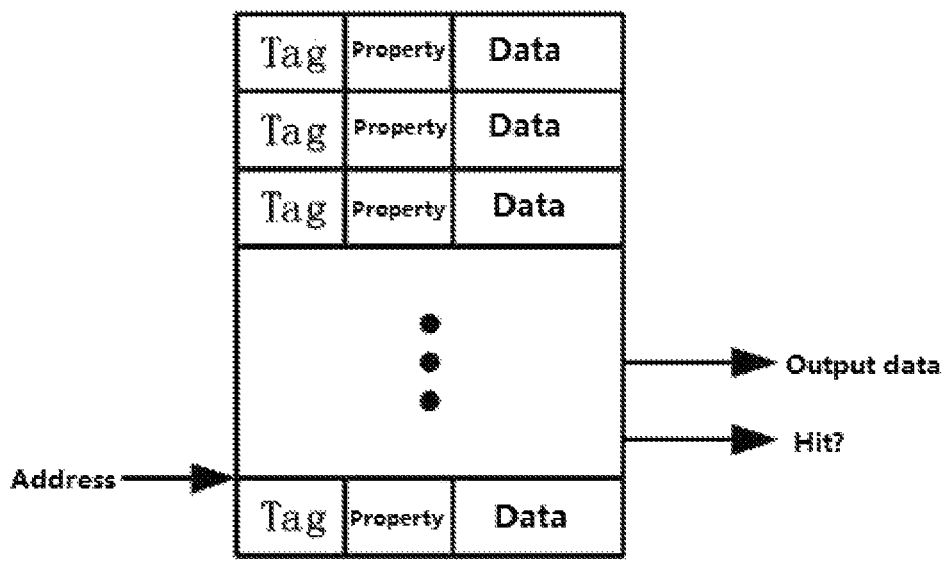
FIG. 1 is a structural schematic diagram of a cache in the prior art.
Figure 2:
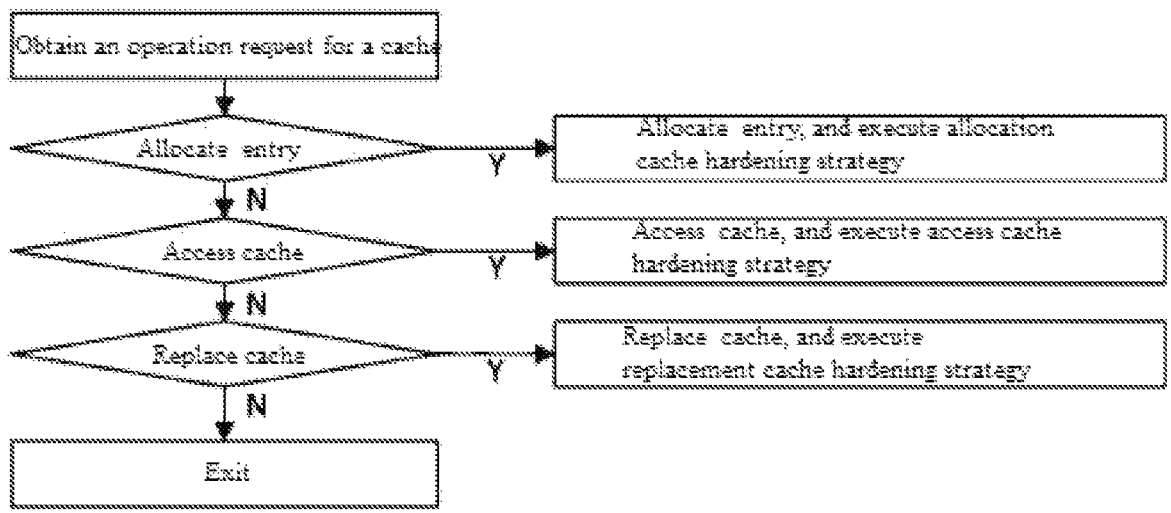
FIG. 2 is a schematic flowchart of a method according to embodiment 1 of the present disclosure.

As shown in FIG. 2, a method for securing a cache against side channel attacks in this embodiment includes the following steps.

Figure 3:
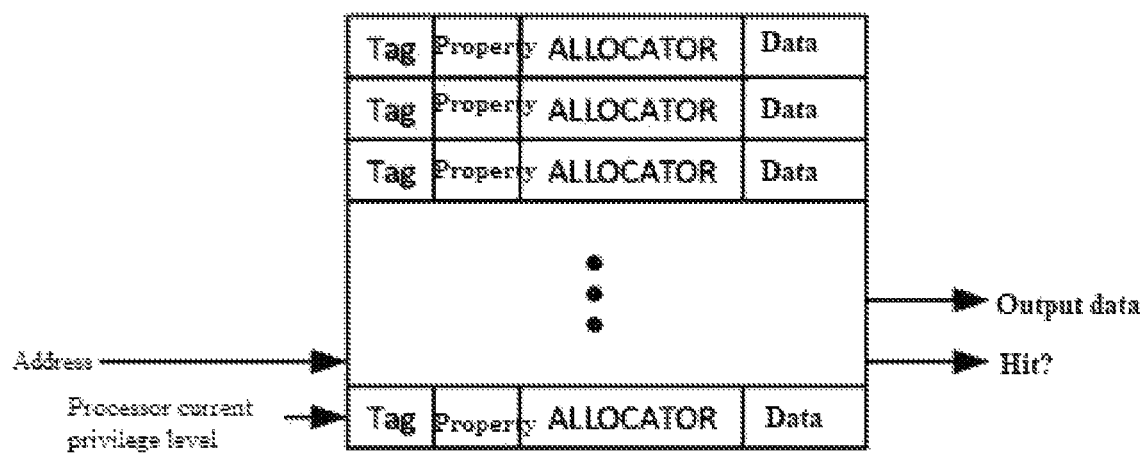
FIG. 3 is a structural schematic diagram of a cache after being secured according to embodiment 1 of the present disclosure.
Figure 4:
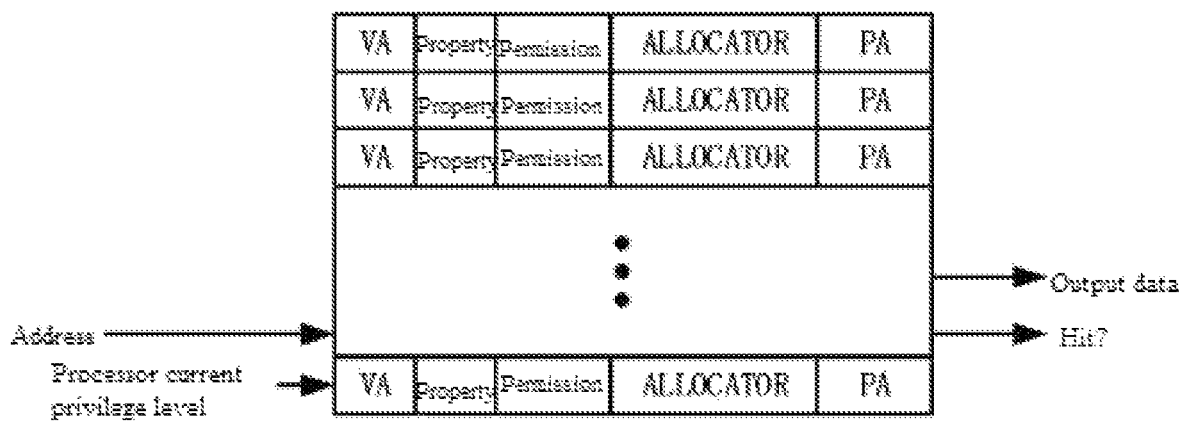
FIG. 4 shows a structure of a TLB cache after being secured according to embodiment 1 of the present disclosure.
Figure 5:
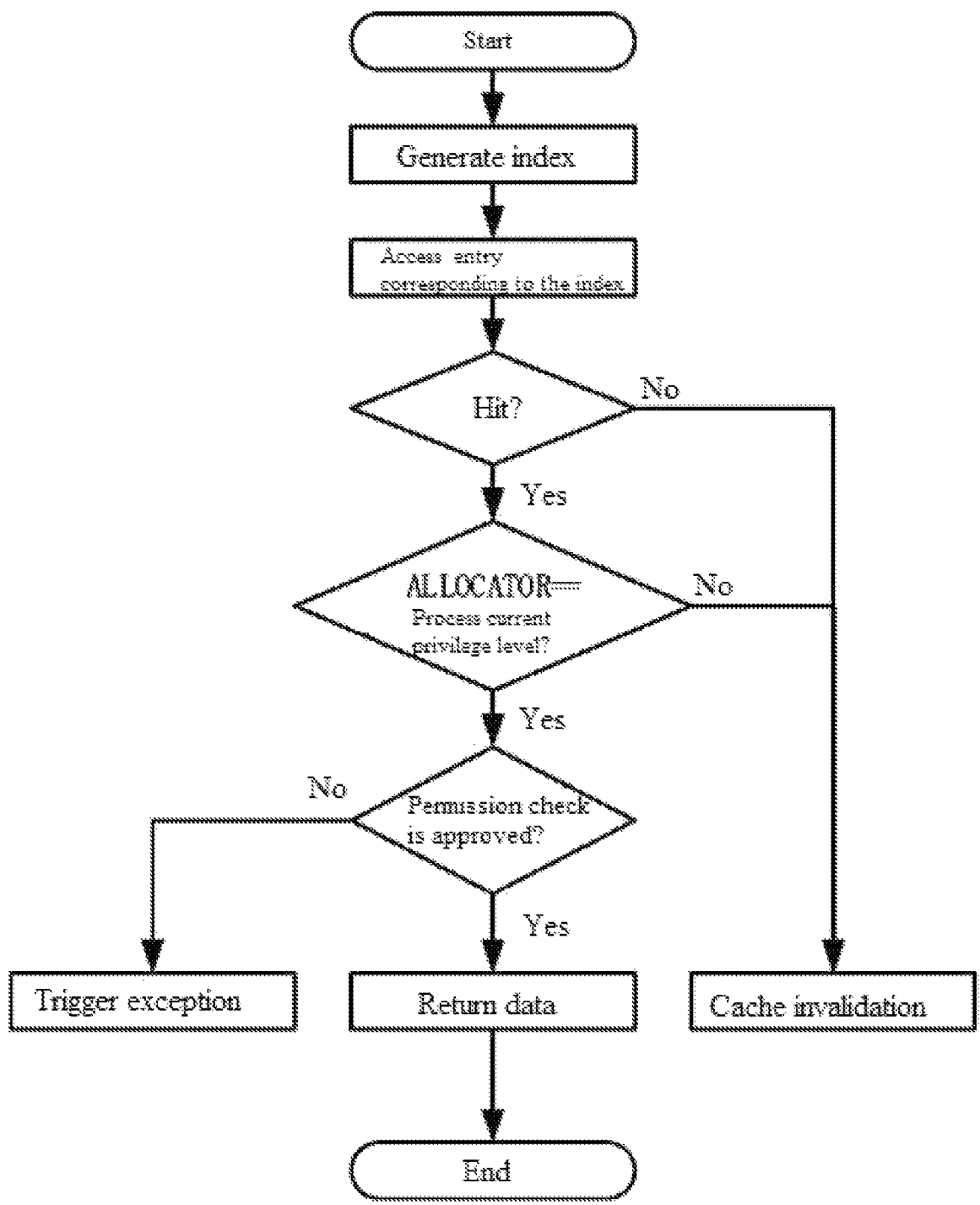
FIG. 5 shows an access process of a TLB after being secured according to embodiment 1 of the present disclosure.

1) obtaining an operation request for the cache, wherein an entry of the cache includes an allocator identifier ALLOCATOR field, as shown in FIG. 3 and FIG. 4; when the operation request is the allocation entry, skipping to perform step 2); when the operation request is an access entry, skipping to perform step 3); and when the operation request is a replacement entry, skipping to perform step 4);

2) allocating an entry for the operation request, and executing an allocation of a cache securing strategy: filling an identifier of a software domain currently running on the processor into the ALLOCATOR field of the allocation entry; ending and exiting;

3) accessing the cache for the operation request, and executing an access of the cache securing strategy: hitting the cache entry only if the identifier of the software domain currently running on the processor is identical to the ALLOCATOR field in the cache entry; not hitting the cache entry if the identifier of the software domain currently running on the processor is different from the ALLOCATOR field in the cache entry; ending and exiting. As shown in FIG. 5, when the cache is accessed, an index is first generated, the entry corresponding to the index is accessed, and then it is determined whether there is a hit or not. If there is a hit, then it is checked whether the identifier of the software domain currently running on the processor is identical to the ALLOCATOR field in the cache entry. Only if the identifiers are identical and authorized, then the data is returned; otherwise, an exception trigger is returned. If there is no hit, or the identifier of the software domain currently running on the processor is different from the ALLOCATOR field in the cache entry, then a cache invalidation is returned; and 4) replacing the cache for the operation request, and executing a replacement of the cache securing strategy: replacing directly if the cache entry to be replaced is invalid, or the ALLOCATOR field thereof is identical to the identifier of the software domain currently running on the processor; clearing the entire cache if the cache to be replaced is valid and the ALLOCATOR field thereof is different from the identifier of the software domain currently running on the processor; ending and exiting.

In this embodiment, the identifier of the software domain in step 2) specifically refers to one or a combination of a current privilege level, a virtual machine ID, a process ID, and an in-process software domain partition ID.

In this embodiment, the step of not hitting the cache entry in step 3) further includes waiting for a specified number of T clock cycles, and then using the data stored in the cache entry to change the ALLOCATOR field of the entry to the identifier of the software domain currently running on the processor, where T may be a value approximately equal to the delay of cache invalidation.

In this embodiment, the detailed step of clearing the entire cache in step 4) includes: if the cache is a fully-associative cache, then directly replacing the selected cache entry to be replaced; and if the cache is a set-associative cache, then invalidating the entire way, wherein the row to be replaced is located in the way.

The present disclosure can secure the cache in the processor against side channel attacks by using less amount of hardware, improves the security of the processor, and has the advantages of easy implementation, wide application areas, and relatively low performance penalty. In addition, the present disclosure further provides a device for securing a cache against side channel attacks, which includes a microprocessor with a cache management module, and the cache management module is programmed to perform the steps of the method for securing the cache against the side channel attacks in the present disclosure.

Embodiment 2

This embodiment is basically the same as embodiment 1. The main difference is that a unified hardware control bit SC_HARDEN_EN_G is added to control whether to execute a corresponding securing strategy.

A method for securing a cache against side channel attacks in this embodiment includes the following steps:

1) reading the unified hardware control bit SC_HARDEN_EN_G, and obtaining an operation request for the cache, wherein an entry of the cache includes an allocator identifier ALLOCATOR field; when the operation request is the allocation entry, skipping to perform step 2); when the operation request is an access entry, skipping to perform step 3); and when the operation request is a replacement entry, skipping to perform step 4);

2) allocating an entry for the operation request, and executing an allocation of a cache securing strategy if the hardware control bit SC_HARDEN_EN_G is turned on: filling an identifier of a software domain currently running on the processor into the ALLOCATOR field of the allocation entry; ending and exiting;

3) accessing the cache for the operation request, and executing an access of the cache securing strategy if the hardware control bit SC_HARDEN_EN_G is turned on: hitting the cache entry only if the identifier of the software domain currently running on the processor is identical to the ALLOCATOR field in the cache entry; not hitting the cache entry if the identifier of the software domain currently running on the processor is different from the ALLOCATOR field in the cache entry; ending and exiting; and 4) replacing the cache for the operation request, and executing a replacement of the cache securing strategy if the hardware control bit SC_HARDEN_EN_G is turned on: replacing directly if the cache entry to be replaced is invalid, or the ALLOCATOR field thereof is identical to the identifier of the software domain currently running on the processor; clearing the entire cache if the cache to be replaced is valid and the ALLOCATOR field thereof is different from the identifier of the software domain currently running on the processor; ending and exiting.

Embodiment 3

This embodiment is basically the same as embodiment 1. The main difference is that a hardware control bit SC_HARDEN_EN_TLB corresponding to the cache is added to control whether the cache or this type of cache executes the corresponding securing strategy.

A method for securing a cache against side channel attacks in this embodiment includes the following steps:

1) obtaining an operation request for the cache, and reading a hardware control bit SC_HARDEN_EN_TLB corresponding to the target cache of the current operation request; wherein an entry of the cache includes an allocator identifier ALLOCATOR field; when the operation request is the allocation entry, skipping to perform step 2); when the operation request is an access entry, skipping to perform step 3); and when the operation request is a replacement entry, skipping to perform step 4);

2) allocating an entry for the operation request, and executing an allocation of a cache securing strategy if the hardware control bit SC_HARDEN_EN_TLB is turned on: filling an identifier of a software domain currently running on the processor into the ALLOCATOR field of the allocation entry; ending and exiting;

3) accessing the cache for the operation request, and executing an access of the cache securing strategy if the hardware control bit SC_HARDEN_EN_TLB is turned on: hitting the cache entry only if the identifier of the software domain currently running on the processor is identical to the ALLOCATOR field in the cache entry; not hitting the cache entry if the identifier of the software domain currently running on the processor is different from the ALLOCATOR field in the cache entry; ending and exiting; and 4) replacing the cache for the operation request, and executing a replacement of the cache securing strategy if the hardware control bit SC_HARDEN_EN_TLB is turned on: replacing directly if the cache entry to be replaced is invalid, or the ALLOCATOR field thereof is identical to the identifier of the software domain currently running on the processor; clearing the entire cache if the cache to be replaced is valid and the ALLOCATOR field thereof is different from the identifier of the software domain currently running on the processor; ending and exiting.

Embodiment 4

This embodiment is basically the same as embodiment 1. The main difference is that a unified hardware control bit SC_HARDEN_EN_G and a hardware control bit SC_HARDEN_EN_TLB corresponding to the cache are added. The unified hardware control bit SC_HARDEN_EN_G and the hardware control bit SC_HARDEN_EN_TLB are configured to control whether the cache or this type of cache executes the corresponding securing strategy.

A method for securing a cache against side channel attacks in this embodiment includes the following steps:

1) reading the unified hardware control bit SC_HARDEN_EN_G, obtaining an operation request for the cache, and reading the hardware control bit SC_HARDEN_EN_TLB corresponding to the target cache of the current operation request, wherein an entry of the cache includes an allocator identifier ALLOCATOR field; when the operation request is the allocation entry, skipping to perform step 2); when the operation request is an access entry, skipping to perform step 3); and when the operation request is a replacement entry, skipping to perform step 4);

2) allocating an entry for the operation request, and executing an allocation of a cache securing strategy if the hardware control bit SC_HARDEN_EN_G and the hardware control bit SC_HARDEN_EN_TLB are both turned on: filling an identifier of a software domain currently running on the processor into the ALLOCATOR field of the allocation entry; ending and exiting;

3) accessing the cache for the operation request, and executing an access of the cache securing strategy if the hardware control bit SC_HARDEN_EN_G and the hardware control bit SC_HARDEN_EN_TLB are both turned on: hitting the cache entry only if the identifier of the software domain currently running on the processor is identical to the ALLOCATOR field in the cache entry; not hitting the cache entry if the identifier of the software domain currently running on the processor is different from the ALLOCATOR field in the cache entry; ending and exiting; and 4) replacing the cache for the operation request, and executing a replacement of the cache securing strategy if the hardware control bit SC_HARDEN_EN_G and the hardware control bit SC_HARDEN_EN_TLB are both turned on: replacing directly if the cache entry to be replaced is invalid, or the ALLOCATOR field thereof is identical to the identifier of the software domain currently running on the processor; clearing the entire cache if the cache to be replaced is valid and the ALLOCATOR field thereof is different from the identifier of the software domain currently running on the processor; ending and exiting.

In this embodiment, the unified control bit SC_HARDEN_EN_G and the separate control bit SC_HARDEN_EN_TLB are both provided. The unified control bit SC_HARDEN_EN_G is configured to control all caches in the processor to start the above securing mechanism. The separate control bit SC_HARDEN_EN_TLB is configured to separately start the securing mechanism of a certain TLB or a type of TLB in the processor when the unified control bit is turned on.

Embodiment 5

This embodiment is basically the same as embodiment 4. The main difference is that the hardware control bit SC_HARDEN_EN_TLB corresponding to the target cache is not controlled by the unified hardware control bit SC_HARDEN_EN_G in this embodiment. The unified control bit SC_HARDEN_EN_G is configured to control all caches in the processor to start the above securing mechanism. The separate control bit SC_HARDEN_EN_TLB is configured to separately start the securing mechanism of a certain TLB or a type of TLB in the processor when the unified control bit is not turned on (turned off).

A method for securing a cache against side channel attacks in this embodiment includes the following steps:

1) reading a unified hardware control bit SC_HARDEN_EN_G, obtaining an operation request for the cache, and reading a hardware control bit SC_HARDEN_EN_TLB corresponding to the target cache of the current operation request, wherein an entry of the cache includes an allocator identifier ALLOCATOR field; when the operation request is the allocation entry, skipping to perform step 2); when the operation request is an access entry, skipping to perform step 3); and when the operation request is a replacement entry, skipping to perform step 4);

2) allocating an entry for the operation request, and executing an allocation of a cache securing strategy if the hardware control bit SC_HARDEN_EN_G is turned off and the hardware control bit SC_HARDEN_EN_TLB is turned on: filling an identifier of a software domain currently running on the processor into the ALLOCATOR field of the allocation entry; ending and exiting;

3) accessing the cache for the operation request, and executing an access of the cache securing strategy if the hardware control bit SC_HARDEN_EN_G is turned off and the hardware control bit SC_HARDEN_EN_TLB is turned on: hitting the cache entry only if the identifier of the software domain currently running on the processor is identical to the ALLOCATOR field in the cache entry; not hitting the cache entry if the identifier of the software domain currently running on the processor is different from the ALLOCATOR field in the cache entry; ending and exiting; and 4) replacing the cache for the operation request, and executing a replacement of the cache securing strategy if the hardware control bit SC_HARDEN_EN_G is turned off and the hardware control bit SC_HARDEN_EN_TLB is turned on: replacing directly if the cache entry to be replaced is invalid, or the ALLOCATOR field thereof is identical to the identifier of the software domain currently running on the processor; clearing the entire cache if the cache to be replaced is valid and the ALLOCATOR field thereof is different from the identifier of the software domain currently running on the processor; ending and exiting.

The above embodiments are only preferred embodiments of the present disclosure. The scope of protection of the present disclosure is not limited to the above embodiments. Any technical solution under the idea of the present disclosure belongs to the protection scope of the present disclosure. It should be noted that for those of ordinary skill in the art, improvements and modifications without departing from the principle of the present disclosure should also be regarded to fall within the scope of protection of the present disclosure.

What is claimed is:

1. A method for securing a cache against side channel attacks, comprising the following steps:
   a step of obtaining an operation request for the cache, wherein a cache entry comprises an allocator identifier field ALLOCATOR; when the operation request is to access an entry, skipping to perform a step of accessing the cache based on the operation request; and when the operation request is to replace an entry, skipping to perform a step of replacing the cache based on the operation request;
   the step of accessing the cache based on the operation request, and executing an access of the cache securing strategy: hitting a cache entry only if an identifier of a software domain currently running on a processor is identical to the ALLOCATOR field of the cache entry; not hitting the cache entry if the identifier of the software domain currently running on the processor is different from the ALLOCATOR field of the cache entry, wherein, the step of not hitting the cache entry further comprises waiting for a predetermined number of T clock cycles, and then using data stored in the cache entry to change the ALLOCATOR field of the cache entry to the identifier of the software domain currently running on the processor wherein T may be a value approximately equal to a delay of a cache invalidation; and
   the step of replacing the cache based on the operation request, and executing a replacement of the cache securing strategy: replacing directly if the cache entry to be replaced is in invalid state, or the ALLOCATOR field of the cache entry to be replaced is identical to an identifier of a software domain currently running on a processor; clearing the cache if the cache entry to be replaced is valid and the ALLOCATOR field of the cache entry to be replaced is different from the identifier of the software domain currently running on the processor wherein clearing the cache comprises: if the cache employs a fully-associative method, then directly replacing the cache entry to be replaced; and if the cache employs a set-associative method, then invalidating the cache.

2. A method for securing a cache against side channel attacks, comprising the following steps:
   a step of reading a unified hardware control bit SC_HARDEN_EN_G, and obtaining an operation request for the cache, wherein a cache entry comprises an allocator identifier ALLOCATOR field; when the operation request is to access an entry, skipping to perform a step of accessing the cache based on the operation request; and when the operation request is to replace an entry, skipping to perform a step of replacing the cache based on the operation request;
   the step of accessing the cache based on the operation request, and executing an access of the cache securing strategy if the hardware control bit SC_HARDEN_EN_G is turned on: hitting the cache entry only if an identifier of a software domain currently running on a processor is identical to the ALLOCATOR field of the cache entry; not hitting the cache entry if the identifier of the software domain currently running on the processor is different from the ALLOCATOR field of the cache entry, wherein, the step of not hitting the cache entry further comprises waiting for a predetermined number of T clock cycles, and then using data stored in the cache entry to change the ALLOCATOR field of the cache entry to the identifier of the software domain currently running on the processor wherein T may be a value approximately equal to a delay of a cache invalidation; and
   the step of replacing the cache based on the operation request, and executing a replacement of the cache securing strategy if the hardware control bit SC_HARDEN_EN_G is turned on: replacing directly if the cache entry to be replaced is invalid, or the ALLOCATOR field of the cache entry to be replaced is identical to an identifier of a software domain currently running on a processor; clearing the cache if the cache entry to be replaced is valid and the ALLOCATOR field of the cache entry to be replaced is different from the identifier of the software domain currently running on the processor wherein clearing the cache comprises: if the cache employs a fully-associative method, then directly replacing the cache entry to be replaced; and if the cache employs a set-associative method, then invalidating the cache.

3. A method for securing a cache against side channel attacks, comprising the following steps:
   a step of obtaining an operation request for the cache, and reading a hardware control bit SC_HARDEN_EN_TLB corresponding to the cache of the operation request; wherein a cache entry comprises an allocator identifier ALLOCATOR field; when the operation request is to access an entry, skipping to perform a step of accessing the cache based on the operation request; and when the operation request is to replace an entry, skipping to perform a step of replacing the cache based on the operation request;
   the step of accessing the cache based on the operation request, and executing an access of the cache securing strategy if the hardware control bit SC_HARDEN_EN_TLB is turned on: hitting the cache entry only if an identifier of a software domain currently running on a processor is identical to the ALLOCATOR field of the cache entry; not hitting the cache entry if the identifier of the software domain currently running on the processor is different from the ALLOCATOR field of the cache entry, wherein, the step of not hitting the cache entry further comprises waiting for a predetermined number of T clock cycles, and then using data stored in the cache entry to change the ALLOCATOR field of the cache entry to the identifier of the software domain currently running on the processor wherein T may be a value approximately equal to a delay of a cache invalidation; and
   the step of replacing the cache based on the operation request, and executing a replacement of the cache securing strategy if the hardware control bit SC_HARDEN_EN_TLB is turned on: replacing directly if the cache entry to be replaced is invalid, or the ALLOCATOR field of the cache entry to be replaced is identical to an identifier of a software domain currently running on a processor; clearing the cache if the cache entry to be replaced is valid and the ALLOCATOR field of the cache entry to be replaced is different from the identifier of the software domain currently running on the processor wherein clearing the cache comprises: if the cache employs a fully-associative method, then directly replacing the cache entry to be replaced; and if the cache employs a set-associative method, then invalidating the cache.

4. The method for securing the cache against the side channel attacks according to claim 1, wherein, the step of accessing the cache based on the operation request comprises: when the cache is accessed, an index is generated such that an entry corresponding to the index is accessed and then it is determined whether there is a hit or not.

5. The method for securing the cache against the side channel attacks according to claim 2, wherein, the step of accessing the cache based on the operation request comprises: when the cache is accessed, an index is generated such that an entry corresponding to the index is accessed and then it is determined whether there is a hit or not.

6. The method for securing the cache against the side channel attacks according to claim 3, wherein, the step of accessing the cache based on the operation request comprises: when the cache is accessed, an index is generated such that an entry corresponding to the index is accessed and then it is determined whether there is a hit or not.

* * * * *